Sept. 28, 1965  C. J. KLISS  3,208,120
HOSE CLAMPS
Filed March 17, 1964
FIG. 1a PRIOR ART
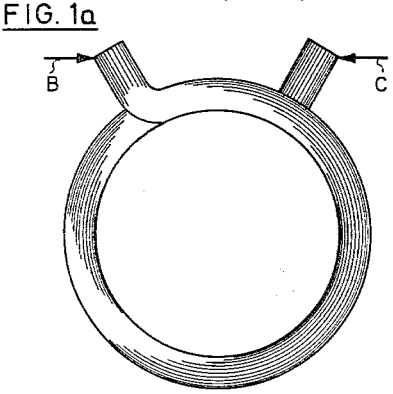
FIG. 2a
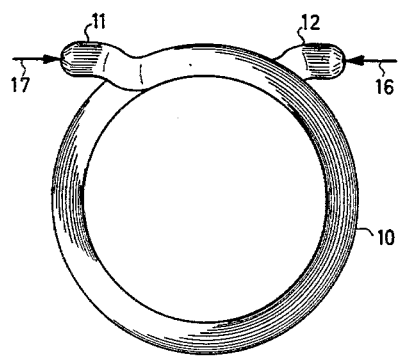
FIG. 1b
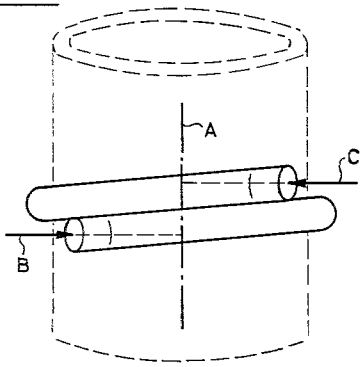
FIG. 2b
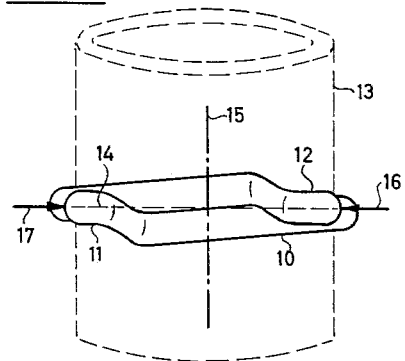
FIG. 1c
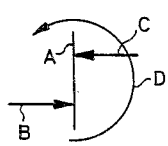
FIG. 2c
FIG. 3
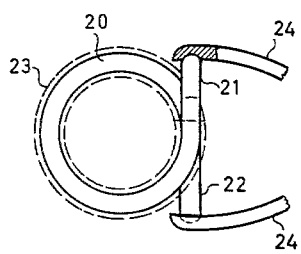
FIG. 4
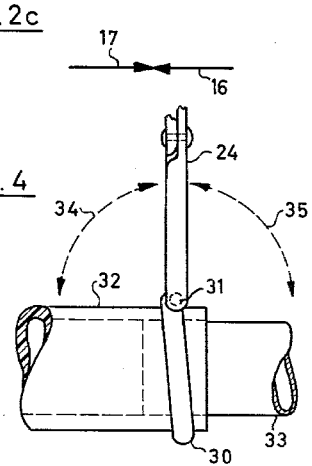
INVENTOR.
BY CHARLES J. KLISS

United States Patent Office 3,208,120
Patented Sept. 28, 1965

3,208,120
HOSE CLAMPS
Charles J. Kliss, 179 Palisade Ave., Garfield, N.J.
Filed Mar. 17, 1964, Ser. No. 352,436
2 Claims. (Cl. 24—27)

This invention relates to hose clamps and, more particularly, to hose clamps constructed so that during installation or removal no turning moment is produced to cause the hose clamp to tend to fly out of the gripping tool.

Hose clamps of the type constructed of a loop of spring wire are commonly used to maintain rubber hoses on cylindrical pipes, such as the inlet to an automobile radiator, for example. One type of such prior clamp is shown in FIGS. 1a, 1b and 1c. A very important shortcoming of this type of clamp is that during installation or removal, when force is applied to the protruding ends to expand the clamp, a substantial turning moment, or torque, is produced. This turning moment can cause the clamp to fly out of a pair of pliers used to expand the clamp and severe injury to the mechanic has resulted many times in the past.

The manner in which this turning moment arises can be explained as follows. As seen in FIGS. 1a and 1b, the prior art hose clamp consists generally of a helical loop of spring wire with two protruding ends which are pressed together with pliers, for example, to expand the clamp for installation. In FIG. 1b, A represents the axis of the helical portion which is shown gripping a dotted section of rubber hose. The arrows B and C represent the force applied to the protruding ends to expand the clamp. If the force is applied as indicated by arrows B and C, acting on the protruding ends perpendicular to the axis of the helix, the result is as shown in FIG. 1c. As indicated in FIG. 1c, a turning moment D is produced which tends to make the clamp fly out of the pliers. For example, if 50 pounds of force are applied to expand the clamp and the pitch of the helix is three-eighths of an inch, a turning moment of approximately 19 inch-pounds results. Applicant has found that regardless of how prior hose clamps are gripped, when the hose clamp is expanded it becomes dynamically unstable because of the way the force is applied to the basic helical spring loop.

In addition, prior clamps of the type shown in FIGS. 1a and 1b have long protruding ends with sharp corners. The result is that mechanics and automobile owners working on engines on which such prior hose clamps are installed have been cut and had their clothes ripped on the sharp protruding ends. Another defect of prior hose clamps is the fact that such clamps can only be expanded to a limited degree for installation or removal. This becomes especially important because in use, hoses tend to expand with age and increased expansion of a hose clamp is necessary for efficient removal.

It has been suggested that some of the danger inherent in these prior hose clamps can be avoided by using special tools to install or remove the clamps. That is not an adequate solution because it is the inexperienced automobile owner who is very likely to be injured while attempting to repair his automobile and it is extremely unlikely that he will have the special tool available when the need for repairs arises.

An object of this invention is to provide hose clamps that are safe for use by inexperienced automobile owners as well as by mechanics and hose clamps that are efficient in use as well as being quickly installed and removed and that are also inexpensive to manufacture.

Another object is to provide hose clamps that are neat in appearance with no sharp protruding ends sticking out to cause injury to an automobile owner or mechanic working on an automobile, thereby avoiding serious injuries which have been caused by sharp protruding ends of prior types of hose clamps.

Futher objects are to provide hose clamps with rounded tips on the end sections so that the clamps can be securely gripped by a plierlike tool having hemispherical sockets in the jaws, and hose clamps of generally helical form with end sections which overlap and then bend toward each other laterally so that the clamps are dynamically stable when fully expanded and can be installed and removed safely and easily with no danger of a hose clamp flying out of an installation tool to injure the mechanic.

Further objects are to provide hose clamps that permit increased expansion to allow easy installation as well as removal from old deteriorated hoses which may swell with age so as to require increased expansion of the hose clamp for efficient removal. In addition, a plastic covering may be provided on hose clamps in accordance with the invention to improve the gripping action during installation by promoting proper seating and uniform clamping and also to permit easy removal by preventing rusting which can cause a hose clamp to adhere to a deteriorated hose.

In accordance with the invention, a hose clamp comprises an elongated spring member having a central loop section of helical form and overlapping end sections formed so that a straight line joining the tips of the end sections is substantially perpendicular to the axis of the helix.

For a better understanding of the present invention, together with other and further objects thereof, reference is had to the following description, taken in connection with the accompanying drawings, and its scope will be pointed out in the appended claims.

In the drawings, FIGS. 1a, 1b and 1c show a prior art hose clamp, FIGS. 2a, 2b and 2c show one embodiment of a hose clamp constructed in accordance with the invention, and FIGS. 3 and 4 show other views of hose clamps constructed in accordance with the invention.

Referring now to FIGS. 2a and 2b, there is shown a hose clamp in the form of an elongated spring member which may be constructed of steel spring wire. The spring member illustrated has a central loop section 10, of helical form, and overlapping end sections 11 and 12. As shown, the end sections 11 and 12 are formed so that they extend outward from the central loop section 10 and are bent toward each other laterally. The side view of FIG. 2a shows how the end sections 11 and 12 extend outward from the central loop section 10. The top view of FIG. 2b shows how the end sections 11 and 12 are bent toward each other laterally so that each end section partially overlaps the central loop section 10. The nature of the lateral bend can be seen by comparing FIGS. 1b and 2b. FIG. 1b is purely helical in form, while in FIG. 2b the ends have been bent laterally to fall in line with each other.

As shown in FIGS. 2a and 2b, the tips of the end sections 11 and 12 are of hemispherical form. Also included in FIG. 2b is a section of hose 13, shown dotted. Preferably, the inner diameter of the hose clamp in its unexpanded condition is smaller than the outer diameter of the hose 13 to provide efficient clamping after the clamp is installed.

Referring now to the complete hose clamp of FIGS. 2a and 2b, it will be seen that the end sections 11 and 12 are so formed that a straight line 14 joining the tips of the end sections 11 and 12 is perpendicular to line 15, which is the axis of the helix represented by the helical loop section 10.

The operation of the hose clamp of FIGS. 2a and 2b is as follows. In order to expand the clamp for installation on a hose, or for removal, a force is applied to the tips of the end sections 11 and 12. Such a force is represented by the arrows 16 and 17 in FIG. 2b. This force represented by the arrows 16 and 17 will act along the straight line 14, perpendicular to the axis 15 of the helix. As indicated in FIG. 2c, there will be no moment arm associated with the force and, therefore, there will be no turning moment produced. The result is that a hose clamp constructed as shown can be expanded with common household pliers and when expanded will be highly stable with no tendency to fly out of the pliers. Also, since the ends are rounded and protrude much less than in the illustrated prior art hose clamp, the danger of injury to a mechanic is greatly decreased.

Referring now to FIG. 3, there is shown another form of hose clamp constructed in accordance with the invention. The FIG. 3 hose clamp includes a central loop section 20 of helical form and overlapping end sections 21 and 22. The end sections extend outward substantially tangent to the central loop section 20. The top view of the FIG. 3 hose clamp is essentially identical to FIG. 2b, with the end sections 21 and 22 bent toward each other laterally.

The FIG. 3 hose clamp also includes a covering of plastic material 23 covering the central loop section 20. The effect of the covering 23 is to allow the hose clamp to slide more freely relative to the surface of a rubber hose, permitting easier installation and removal of the clamp. The covering 23 prevents rusting of the hose clamp and reduces the tendency for the clamp and a hose to adhere to each other after a period of use. In addition, the plastic covering 23 promotes uniform application of the clamping forces around the circumference of hose on which the clamp is installed, by promoting relative motion as the clamp is placed in position and allowed to contact about the hose.

Also shown in FIG. 3 is a portion of a simple tool 24, which can be used to install or remove the present hose clamps. The tool 24, is plier-like in form, with a hemispherical socket in each jaw as shown in the cut-away view of the upper jaw of tool 24 in FIG. 3. As already noted, the presently disclosed hose clamps can be readily and safely expanded with common pliers, in which case the rounded tips of the end sections insure that the force will act along the center line of each end section, in the manner shown in FIG. 2c, so that no turning moment results. The additional advantage of using a tool such as 24 in FIG. 3 is that the clamps can be safely and securely gripped at a wide range of angles thereby permitting easy installation and removal in cramped areas around an automobile engine. Thus, the tool 24 can be rotated back into the page so it is perpendicular to the page, or rotated out of the page so it is perpendicular to the page, or utilized at any intermediate angle, with complete safety. This is shown more clearly in FIG. 4.

Referring now to FIG. 4, there is shown a side view of a hose clamp similar to the clamp of FIGS. 2a and 2b installed on a section of hose 32, which is fitted over the end of metallic pipe 33. Included in FIG. 4 is the plier-like tool 24 (also shown in FIG. 3) shown in place for removal of clamp 30. One of the rounded ends of clamp 30 is shown dotted at 31. The dotted arrows 34 and 35 indicate the wide range of angles at which the clamp 30 can be securely gripped by tool 24 during installation or removal in cramped areas.

An additional advantage of hose clamps constructed in accordance with the invention as illustrated, is that since the ends extend outward substantially tangentially, instead of upward radially (as in clamp of FIG. 1a) a greater expansion is made possible to facilitate installation or removal.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A hose clamp comprising an elongated spring member having a central substantially closed loop section of helical form having overlapping portions, and an end section extending from each overlapping portion, each of said sections comprising a curved portion and a straight terminal portion, each curved portion extending over the adjacent overlapped portion, each of said straight terminal portions pointing away from each other and lying on a common line substantially tangent to said loop section, and said line lying in a plane perpendicular to the axis of said loop section, whereby when forces are applied to said terminal portions to expand said loop section substantially no turning moment is produced.

2. A hose clamp in accordance with claim 1, wherein said terminal portions are rounded.

References Cited by the Examiner

UNITED STATES PATENTS

| | | | |
|---|---|---|---|
| 1,419,408 | 6/22 | Palhemus. | |
| 1,557,111 | 10/25 | Rutledge | 24—27 |
| 2,081,677 | 5/38 | O'Neill | 24—256 |
| 2,180,271 | 11/39 | Arras | 24—256 |
| 2,559,139 | 7/51 | Wheeler | 24—139 |
| 2,816,338 | 12/57 | Klancnik | 24—27 |
| 2,817,129 | 12/57 | Roberts et al. | 24—27 |

WILLIAM FELDMAN, *Primary Examiner.*

DONLEY J. STOCKING, *Examiner.*